July 28, 1970     R. M. AKERS     3,521,902

STABILIZING DEVICE FOR TRAILERS

Filed Feb. 26, 1968

INVENTOR.
ROBERT M. AKERS
BY
Dunlap and Laney
ATTORNEYS

# United States Patent Office 3,521,902
Patented July 28, 1970

3,521,902
STABILIZING DEVICE FOR TRAILERS
Robert M. Akers, 1300 S. Broadway,
Oklahoma City, Okla. 73125
Filed Feb. 26, 1968, Ser. No. 708,197
Int. Cl. B60s 9/02
U.S. Cl. 280—150.5     13 Claims

ABSTRACT OF THE DISCLOSURE

An auxiliary supporting structure for stabilizing the forward end of double bottom transport trailers of the type having small dolly wheels disposed between the front and rear the trailer, such structure including a pair of horizontally spaced, horizontally extending arms each pivotally secured at one end to the forward end of the trailer for pivotation about spaced, vertically extending axes, and each having a tubular socket at its opposite end slidingly receiving an elongated, vertically extending stabilizer post. The arms are pivotal to a stabilizing first position in which they extend outwardly on each side of the trailer, at which time the stabilizer posts can be made to slide downwardly in their respective sockets until their lower ends contact the ground. Locking pins are extended through mating apertures in the stabilizing posts and their respective tubular sockets to lock them in this position. When the trailer is to be transported by towing with a tractor, the arms are pivoted to a transporting second position in which they are folded inwardly against the forward wall of the trailer, and the stabilizing posts are moved upwardly in the sockets to a position where they clear the bottom of the trailer and allow the fifth wheel of the tractor vehicle to be moved under the forward end of the trailer.

BACKGROUND OF THE INVENTION

Field of the invention

The present invention relates to transport trailer vehicle constructions, and more particularly, relates to a stabilizing device or auxiliary supporting structure which may be used to impart greater stability to a double bottom trailer at such time as the tractor vehicle used to tow such trailer is disconnected and removed therefrom.

Brief description of the prior art

Large transport trailers of the type having compound rear wheels and a pair of small dolly wheels positioned between these rear wheels and the point at which the fifth wheel of a tractor vehicle is connected to the trailer are usually loaded at a time when the tractor vehicle is disconnected from the trailer, and the trailer is supported on its compound rear wheels and dolly wheels. Due to the location of the dolly wheels at a substantial distance from the forward end of the trailer, the positioning of a heavy load in the extreme forward end of the trailer can result in unbalancing of the trailer to the extent that it will tip over in a forward direction. Unfortunately, sufficient precautions are not always taken in the loading of the trailer vehicles to avoid this result, and considerable time and expense is involved in righting the trailers which have been tipped over by such uneven distribution of the weight of the load.

BRIEF DESCRIPTION OF THE PRESENT INVENTION

The present invention provides an auxiliary supporting structure for stabilizing and supporting the forward end of so-called double bottom transport trailers of the type which have small dolly wheels spaced rearwardly from the front end of the trailer and a plurality of ground engaging rear wheels. The auxiliary supporting structure of the invention broadly comprises rigid support means which is secured to the forward wall of the trailer body; at least one horizontally extending, elongated arm pivotally secured at one of its ends to the rigid support means for pivotation about a vertical axis and carrying at its other end socket means; and an elongated, vertically extending stabilizing post which is engaged by the socket means, and is movable relatively thereto in a vertical direction. There is further provided means for detachably securing or engaging the stabilizing post against vertical movement relative to the socket means so that the stabilizing post can be secured in its socket means in a preselected position.

In a preferred embodiment of the invention, the rigid support means which is secured to the front wall of the trailer body includes elongated structural members which define a pair of elongated, horizontally extending, C-shaped channels located on the opposite sides of the front to rear center line of the trailer body and arranged so that the C-shaped channels face forwardly and have their open sides exposed. One of the elongated, horizontally extending arms is then pivotally secured in each of the C-shaped channels and is dimensioned so that each elongated arm can fit or nest within its respective C-shaped channel when folded against the forward wall of the trailer body by pivotation about its vertical axis. The socket means disposed at the opposite ends of the elongated arms from those ends which are pivotally secured to the rigid support means are preferably tubular, and each include suitable keyways or apertures which can be aligned with keyways or apertures in the respective stabilizing posts which slide in such sockets. Pins may be extended through the mating keyways or apertures when they are aligned to lock the stabilizing post in a desired position. Keying or latching means is also provided for detachably securing each of the elongated, horizontally extending arms in one of two positions with respect to its respective C-shaped channel. In one of these positions, the arm extends laterally outwardly with respect to its pivotal axis so that the socket at one end of the arm is positioned outwardly from the side of the trailer. In a second or transport position, the arms can be folded inwardly about their vertical pivotal axes so that their respective sockets are adjacent the center line of the trailer, and the arms thus do not present any obstruction at the side of the trailer.

In the use of the stabilizing device of the invention, at such time as the trailer is positioned for loading and it is desired to disconnect the tractor truck therefrom, the dolly wheels are, of course, extended downwardly into contact at the ground in accordance with the usual practice with trailers of this type. The elongated, horizontally extending arms are then pivoted about their respective vertical pivotal axes to move them outwardly so that their ends carrying the tubular sockets are positioned outwardly from the opposite sides of the trailer. The vertically extending stabilizer posts slidingly engaged by the sockets of each arm are then moved downwardly in their respective sockets until the lower ends of the stabilizing posts contact the ground. The pin, key or other securing device used to secure the stabilizing post in this position is then engaged with the post and its respective socket so that the stabilizing post is locked in its ground engaging position. With stabilizing posts thus positioned on opposite sides of the trailer body and engaging the ground at the forward end of the tractor, no possibility exists of the trailer being tipped forwardly as a result of excessive weight at the front end of the trailer at the outset of the loading operation.

From the foregoing brief and general description of the invention, it will have become apparent that an important object of the invention is to provide trailer stabilizzing apparatus for stabilizing and supporting the front end of heavy double bottom transport trailers so as to prevent the trailer from tipping forward at such time as a heavy load may be positioned within the trailer at a location which is forward of the dolly wheels.

An additional object of the present invention is to improve the safety with which so-called pup trailers may be utilized, and particularly, the degree of safety with which such trailers may be loaded and unloaded.

An additional object of the invention is to provide auxiliary supporting structure for utilization with transport trailers to improve the stability of such trailers during loading, such structure being easily utilized by one having relatively little mechanical skill, and providing no interference with the connection and disconnection of a towing tractor vehicle with the trailer.

Yet another object of the invention is to provide a stabilizing device for transport trailers, which device can be relatively economically manufactured and marketed, yet is characerized by a long and trouble-free operating life.

Additional objects and advantages of the invention will become apparent from the following detailed description of the invention when considered in conjunction with the accompanying drawings which illustrate the invention.

DETAILED DESCRIPTION OF A PREFERRED EMBODIMENT OF THE INVENTION

Figure 1:
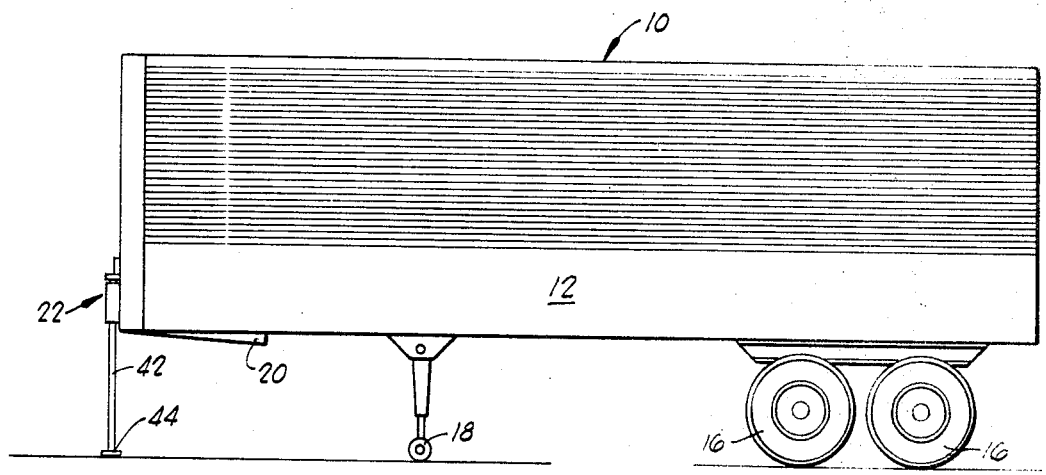
FIG. 1 is a side elevation view of a trailer constructed in accordance with the present invention incorporating, in combination with the trailer body, the stabilizing device of the present invention.
Figure 2:
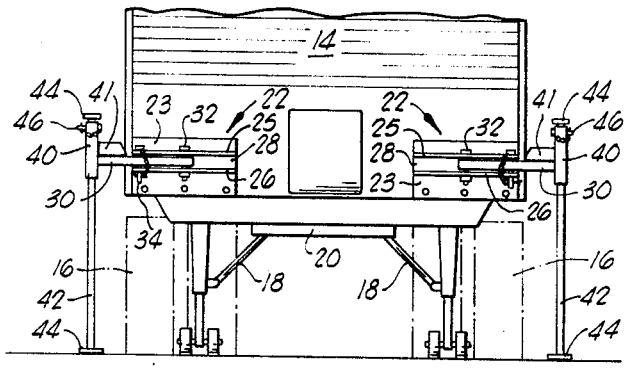
FIG. 2 is a front elevation view of the trailer depicted in FIG. 1, and illustrating in greater detail the stabilizing device of the present invention as it appears when in use for providing auxiliary support and stabilization to the forward end of the trailer.
Figure 5:
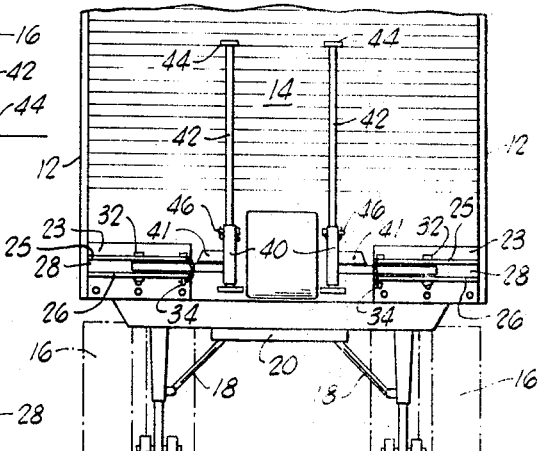
FIG. 5 is a view similar to FIG. 2, but illustrating the stabilizing device of the invention in its inoperative transport position.

Referring initially to FIG. 1 of the drawings, the body of the transport trailer there illustrated is designated generally by reference numeral 10 and includes side walls 12, a bottom (not visible), and a front wall 14 (see FIGS. 2 and 5). The trailer body 10 is supported upon compound, ground engaging rear wheels 16, and at such time as the tractor vehicle used to tow the trailer is disconnected, a pair of extensible dolly wheel structures 18 are extended downwardly into engagement with the ground to provide support for the forward portion of the trailer. Located forwardly of the dolly wheel structures 18 is a fifth wheel engaging structure 20 which is employed to engage the fifth wheel of the tractor vehicle to facilitate towing of the trailer. The auxiliary supporting and stabilizing device of the present invention is designated generally by reference numeral 22 and is secured to the forward wall 14 of the trailer body 10 in a manner hereinafter described in greater detail.

Figure 4:
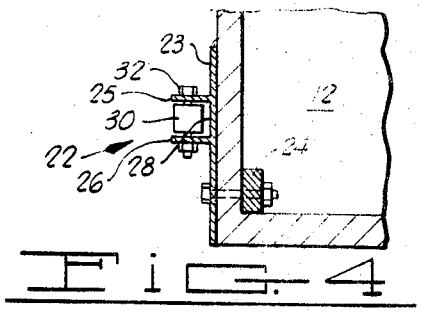
FIG. 4 is a sectional view taken along line 4—4 of FIG. 3.
Figure 3:
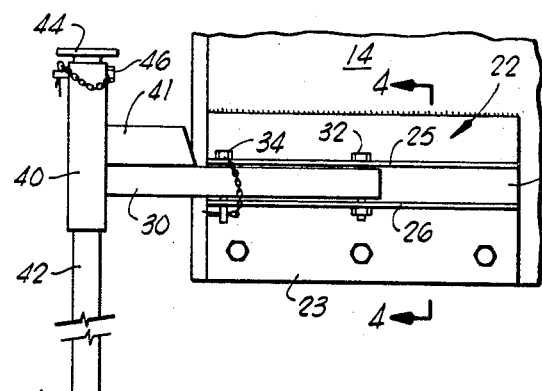
FIG. 3 is a detail view illustrating in elevation, a portion of the stabilizing device of the invention.

The details of construction of the stabilizing device of the invention are best illustrated in FIGS. 2–4. In the illustrated embodiment of the invention, the stabilizing device 22 includes rigid support means which comprises two horizontally spaced mounting plates 23 disposed adjacent the opposite side walls 12 of the trailer 10, and secured adjacent the lower edge of the front wall 14 of the trailer. The mounting plates 23 in the illustrated embodiment of the invention are welded along their upper edges to the front wall 14 of the trailer body 10, and are also secured to the trailer body by extending bolts through the lower portions of the mounting plates, through the wall 14 and through a strong structural member 24 disposed on the opposite side of the forward wall within the trailer body (see FIG. 4). Each of the mounting plates 23 have secured thereto a pair of substantially parallel, horizontally extending, forwardly projecting flanges 25 and 26 which define a generally C-shaped channel 28.

The stabilizing structure 22 further includes a pair of elongated, horizontally extending arms 30, with each of these arms having one of its ends pivotally secured between the channel defining flanges 25 and 26 by means of a suitable pivot pin 32. Thus, each of the horizontally extending arms 30 is connected to the forward wall 14 of the trailer for pivotation about a vertically extending axis, with such axis being located approximately midway of the length of the elongated, horizontally extending C-shaped channnl 28. The arms 30 are each transversely dimensioned so that the arm can be nested or fitted within its respective C-shaped channel 28 as best illustrated in FIGS. 3 and 4.

Each arm 30 is provided with at least one aperture or slot therethrough which, when the arm is pivoted outwardly to the position depicted in FIGURES 2 and 3, is in registry with aligned apertures formed in the respective pair of channel defining flanges 25 and 26. With the apertures registered in this manner, a locking pin 34 can be extended through the apertures in the flanges 25 and 26 and in the respective arm 30 to lock the arms in their outwardly extending positions in which a portion of each arm is nested in the outer portion of the respective C-shaped channel 28. It should be further pointed out that each set of channel defining flanges 25 and 26 are also provided with an additional pair of aligned apertures adjacent their inner ends which are positioned for registry with the aperture in the respective arms 30 at such time as the arms 30 are folded inwardly against the forward wall 14 of the trailer into an inoperative, transport position. This position of these arms is illustrated in FIG. 5. With the arms 30 thus folded inwardly to the inoperative, transport position, the locking pin 34 can be passed through the registering apertures to secure the arms in this position. The appearance of the locking pins when thus employed is depicted in FIGURE 5.

At the end of each of the elongated, horizontally extending arms 30 opposite its end which is pivotally secured in the respective C-shaped channel 28 by the pivot pin 32, each of the arms carries a vertically extending, tubular socket 40. A reinforcing brace plate 41 is welded between each of the arms 30 and its respective tubular socket 40. Each of the vertically extending, tubular sockets 40 is open at its upper and lower ends and slidingly engages an elongated, vertically extending stabilizer post 42. Each of the stabilizer posts 42 has a flat arresting plate 44 at both its upper and lower ends, and each post is of a length sufficient to place the lower arresting plate in contact with the ground when the post is slid downwardly in its respective tubular socket 40 to the position depicted in FIGURES 2 and 3.

Adjacent the upper end of each of the stabilizing posts 42 is a small bore which extends through the post in a transverse direction and is positioned for registry with a pair of apertures formed in opposite sides of the tubular socket 40. A locking pin 46 is provided for extending through the apertures in the respective socket 40 and the bore in the respective stabilizing post 42 when these apertures and bore are in alignment. The stabilizing posts 42 are thus prevented from sliding upwardly in the sockets 40 when the locking pins 46 are placed in their locking positions with the posts extended downwardly to the stabilizing positions illustrated in FIGS. 1–3. Preferably, a plurality of bores are provided through each stabilizing post 42 so that the effective length of each post may be adjusted as desired to accommodate the stabilizing device to uneven or unlevel terrain which may lie beneath the forward end of the trailer at the time when loading is commenced.

There is also provided at a point spaced upwardly a short distance above the lower ground engaging plate 44 of each stabilizing post 42, one or more additional bores extending transversely through the respective stabilizing post. These bores are also positioned for registration with the apertures in opposite sides of each of the sockets 40 at such time as the stabilizing posts 42 are moved upwardly to their retracted inoperative or transport position as depicted in FIG. 5. Thus, by moving the stabilizing post upwardly in this manner, they may be detachably secured in such retracted position, and thus do not constitute a downwardly hanging obstruction protruding beneath the bottom of the trailer body 10.

OPERATION OF A PREFERRED EMBODIMENT OF THE INVENTION

In the use of the stabilizing device of the invention, the trailer is towed by a tractor truck in a conventional fashion to a point where the trailer is to be loaded with a cargo. Conventionally, the trailer and tractor are parked at the loading point, the dolly wheels 18 are extended to a ground engaging position as depicted in FIG. 1, and the tractor vehicle is then released from the trailer by disconnection of the fifth wheel, and driving the tractor away from the trailer. Either prior or subsequently to the time of disconnection of the tractor vehicle from the trailer, the stabilizing device 22 of the present invention may be moved from its transport or inoperative position depicted in FIG. 5, to its stabilizing position depicted in FIGS. 1—3 in which it affords auxiliary support for the forward portion of the trailer. In order to move the stabilizing device 22 to its operative, stabilizing position in which it supports and stabilizes the forward end of the trailer, the arms 30 are first swung or pivoted outwardly about the pivot pins 32 to move them from the inwardly extending position depicted in FIG. 5 to the outwardly extending position shown in FIGS. 2 and 3. In this latter position, the arms 30 extend parallel to their respective pairs of flanges 25 and 26 and are nested or fitted within the C-shaped channels 28.

Movement of the arms 30 to the operative stabilizing position also moves the tubular sockets 40 outwardly with respect to the sides 12 of the trailer body 10 so that they occupy the positions shown in FIGS. 2 and 3. It will be noted that, in this position, the sockets 40 and the stabilizing posts 42 which they carry are located outwardly of the ground engaging wheels 16, and they are also sufficiently widely spaced to afford clearance for the trailer supporting portion of the tractor vehicle. Thus, after swinging the arms 30 to their outwardly extending positions as depicted in FIG. 2, the stabilizing posts 42 may be moved downwardly to their ground contacting positions as depicted in this figure by extracting the locking pins 46 from their engagement with the respective tubular sockets 40 and stabilizing posts, and moving these posts downwardly into engagement with the ground, followed by reinsertion of the locking pins. Loading of the trailer can then be commenced without concern for imposing too great a weight on the forward end of the trailer with consequent danger of tipping the trailer body 10 downwardly at the front end thereof. The stabilizing posts 42 provide a firm support for the forward end of the trailer body 10 and the bending moment forces acting upwardly through the posts 42 and the arms 30 are evenly distributed through the flanges 25 and 26 to the mounting plates 23 by virtue of the interfitting relationship of the arms 30 in the C-shaped channel 28. The arms, are, of course, retained in this position by the interlock afforded by the locking pins 34.

After loading of the trailer has been completed, and the tractor vehicle has been returned to the situs of loading for reconnection to the trailer, the tractor vehicle may be backed toward the trailer body 10 so that the fifth wheel of the tractor passes beneath the forward end of the trailer and engages the substructure 20. Again it may be noted that the stabilizing posts 42 are sufficiently widely spaced in a horizontal direction that no interference is afforded by these members with the backing of the tractor to a connecting position with respect to the trailer. When the tractor has been engaged with the trailer to facilitate towing of the trailer, the stabilizing posts 42 can then be slid upwardly in their respective tubular sockets 40 following removal of the locking pins 46, until the ground engaging plates 44 abut the lower ends of these sockets. In this position, the bores which are formed through the stabilizing posts 42 will be in registry with the apertures on opposite sides of each of the sockets 40, and the locking pins 46 may be reinserted to retain the stabilizing posts in their retracted positions. The arms 30 are then pivoted about their pivot pins 32 to swing the sockets 40 and stabilizing posts 42 inwardly to the positions depicted in FIG. 4. In this position, the locking pins 34 may be inserted through the registering apertures in the channel defining flanges 25 and 26 to retain the stabilizing posts 42 closely adjacent the forward wall 14 of the trailer. The stabilizing structure 22 is thus located in a non-obstructive position suitable for transport.

Although a preferred embodiment of the invention has been herein described in order to provide an example of the manner in which the invention is to be practiced, it will be understood that various changes and innovations can be made in the depicted and described structure without departure from the basic principles which underlie the invention. Changes and modifications of this type which do not depart from a reliance upon the basic principles underlying the invention are therefore deemed to be circumscribed by the spirit and scope of the invention except as the same may be necessarily limited by the appended claims or reasonable equivalents thereof.

What is claimed is:

1. Trailer stabilizing apparatus for securement to a transport trailer comprising:
   rigid support means defining an elongated C-shaped channel and adapted to be secured to the forward wall of a trailer with the channel extending horizontally and having its open side exposed;
   an elongated arm having a thickness permitting said arm to fit in said C-shaped channel, said arm having one of its ends pivotally secured in said channel intermediate the ends of said channel for pivotation about a vertical axis when said C-shaped channel extends horizontally;
   a tubular socket secured to the end of said arm opposite its end pivotally secured in said channel and having a bore extending therethrough in a direction parallel to the pivotal axis of said arm;
   an elongated stabilizing post extending slidingly through the bore in said tubular sockets;
   means for detachably securing said arm in said C-shaped channel when said arm extends in said channel in either of two opposite directions from said pivotal axis; and
   means for detachably securing said post against sliding movement in said tubular socket in preselected positions.

2. Trailer stabilizing apparatus as defined in claim 1 wherein said rigid support means comprises a pair of parallel, elongated flanges having said one end of said arm pivotally secured between said flanges.

3. Trailer stabilizing apparatus as defined in claim 1 wherein
   said arm is transversely apertured and said rigid support means includes apertures positioned for alignment with the aperture in said arm when said arm extends in said channel in either of two opposite directions from said pivotal axis; and said means for detachably securing said arm in said C-shaped channel comprises a pin insertable through the aligned apertures in said arm and rigid support means.

4. Trailer stabilizing apparatus as defined in claim 1 wherein:
  said stabilizing post has at least two axially spaced, transverse bores therethrough;
  said socket has apertures therein communicating with the bore which extends through said socket and positioned for registry with the transverse bores through said post when said post is slid to two different positions in said socket; and
  said means for detachably securing said post against sliding movement in said socket comprises a pin insertable through the registered apertures and transverse bore.

5. Trailer stabilizing apparatus as defined in claim 2 wherein said arm is substantially longer than one-half the length of said flanges and is pivotally secured between said parallel flanges at substantially midway of the length of said flanges.

6. Trailer stabilizing apparatus as defined in claim 5 wherein
  said arm is transversely apertured and said parallel flanges include two spaced pairs of aligned apertures, each of the pairs of aligned apertures being positioned for alignment with the transverse aperture in said arm when said arm extends in said channel in either of two opposite directions from said pivotal axis; and
  said means for detachably securing said arm in said C-shaped channel comprises a pin insertable through the aligned apertures in said arm and flanges.

7. Trailer stabilizing apparatus as defined in claim 6 wherein said flanges are secured to and extend normal to a plate adapted for attachment to the front wall of the trailer.

8. Trailer stabilizing apparatus as defined in claim 6 wherein:
  said stabilizing post has a plurality of spaced, transverse bores extending therethrough;
  said socket has apertures therein registrable with said transverse bores; and
  said means for detachably securing said post against sliding movement in said socket comprises a pin insertable through the socket apertures and one of the transverse bores in registry therewith.

9. A trailer vehicle adapted for towing by a self-propelled tractor truck comprising:
  a trailer body having a floor, a front wall and side walls;
  rear wheels secured beneath the floor of the trailer body;
  a pair of retractable dolly wheels secured to the trailer body beneath the floor of the body and between the rear wheels and the front wall of the body;
  a pair of horizontally extending flanges secured to the front wall of said trailer body and defining an elongated C-shaped channel;
  at least one horizontally extending, elongated arm pivotally secured at one of its ends between said flanges for pivotation about a vertical axis, said arm being dimensioned to fit in said C-shaped channel between said flanges;
  socket means secured to the end of each of said arms opposite its end pivotally secured to said horizontally extending flanges;
  an elongated, vertically extending stabilizing post slidingly engaged by each of said socket means for vertical sliding movement in said socket means; and
  means for detachably securing said post against sliding movement in said socket means in a preselected position.

10. A trailer vehicle as defined in claim 9 and characterized further as including
  two pairs of said horizontally extending flanges, said pairs of flanges being disposed on opposite sides of the front to rear centerline of the trailer body and each defining a C-shaped channel; and
  two of said elongated arms, each arm having one of its ends pivotally secured between one pair of said flanges and said arms being disposed on opposite sides of the front to rear centerline of the trailer body.

11. A trailer vehicle as defined in claim 9 wherein said socket means comprises a tubular socket surrounding said post; and
  wherein said securing means comprises a pin extendable through said socket and at least partially through said post.

12. A trailer vehicle as defined in claim 9 and further characterized to include means for securing said elongated arm parallel to said front wall in two different positions.

13. A trailer vehicle as defined in claim 9 and further characterized to include means for securing each of said elongated arms parallel to said front wall in two different positions; and
  wherein said arms are of a length sufficient to extend from their respective pivotal axes to positions outwardly of the side walls of said body.

References Cited

UNITED STATES PATENTS

| | | | |
|---|---|---|---|
| 1,727,430 | 9/1929 | Gilkison | 280—150.5 |
| 2,555,336 | 6/1951 | Hagely. | |
| 2,665,938 | 1/1954 | McCrossen | 214—515 |
| 2,751,234 | 6/1956 | Couse. | |
| 2,985,482 | 5/1961 | Lion | 214—515 |
| 3,146,002 | 8/1964 | Faber | 280—150.5 |

FOREIGN PATENTS 609,709   9/1960   Italy.

LEO FRIAGLIA, Primary Examiner

J. A. PEKAR, Assistant Examiner

U.S. Cl. X.R.

214—515